(12) United States Patent
Chen et al.

(10) Patent No.: US 7,546,402 B2
(45) Date of Patent: Jun. 9, 2009

(54) OPTICAL STORAGE SYSTEM COMPRISING INTERFACE FOR TRANSFERRING DATA

(75) Inventors: Wen-Kuan Chen, Hsinchu County (TW); Yu-Chu Lee, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 412 days.

(21) Appl. No.: 11/087,624

(22) Filed: Mar. 24, 2005

(65) Prior Publication Data

US 2006/0218323 A1 Sep. 28, 2006

(51) Int. Cl.
G06F 13/12 (2006.01)
(52) U.S. Cl. .......................................... 710/71; 710/65
(58) Field of Classification Search .................. 710/65; 725/132, 133; 360/39, 49
See application file for complete search history.

(56) References Cited

U.S. PATENT DOCUMENTS 4,405,952 A * 9/1983 Slakmon ...................... 360/49
5,991,841 A 11/1999 Gafken et al.
2004/0049797 A1* 3/2004 Salmonsen .................. 725/132
2005/0128889 A1* 6/2005 Keller et al. .............. 369/30.04
2006/0018178 A1* 1/2006 Yang et al. ............. 365/230.03

OTHER PUBLICATIONS

Specification of M50LPW040 4 Mbit (512Kbx8, Uniform Block) 3V Supply Low Pin Count Flash Memory, STMicroelectronics (Mar. 2002).
Specification of M25P16 16 Mbit, Low Voltage, Serial Flash Memory With 50MHz SPI Bus Interface, STMicroelectronics (Nov. 2003).

* cited by examiner

*Primary Examiner*—Henry W. H. Tsai
*Assistant Examiner*—Kris Rhu
(74) *Attorney, Agent, or Firm*—Finnegan, Henderson, Farabow, Garrett & Dunner LLP (57) ABSTRACT

An optical storage system for coupling to at least a plurality of peripheral devices. The optical storage system includes a data read subsystem to read out data stored in an optical storage medium, a data process subsystem to generate address information and data information according to the read out data, and an interface controller to generate output data according to the address information and the data information and to transfer the output data to one of the peripheral devices. A number of bits of the output data being transferred in parallel is configurable according to a parallel bit number. The data information and the address information are transferred via the same pins.

39 Claims, 8 Drawing Sheets

OPTICAL STORAGE SYSTEM COMPRISING INTERFACE FOR TRANSFERRING DATA

DESCRIPTION OF THE INVENTION

1. Field of the Invention

The present invention generally relates to an optical storage system and, more particularly, to an optical storage system that includes an interface for transferring data.

2. Background of the Invention

An optical storage system, such as a digital video disc (DVD) system, requires a standalone memory device to store data read out from the disc and/or software programs for operating the optical storage system. In such an optical storage system, an interface is needed to transfer data, commands, and other information to the standalone memory device and to receive data, commands, and other information from the standalone memory device. The optical storage system further needs an interface controller to control the interface to transfer data, commands, and other information between the optical storage system and the standalone memory device. The interface of the optical storage system must be compatible with that of the standalone memory device.

Several memory device structures are well known in the art. One common memory device structure is a FLASH memory, which is non-volatile and easy to update. Most conventional FLASH memories comprise a parallel interface which transfers data and commands in parallel. If a FLASH memory with its parallel interface is used in an optical storage system, both a controller chip of the optical storage system and a chip containing the FLASH memory need a large number of pins to transfer data, commands, and other information in parallel. The large number of pins is needed to support the parallel data transferring operation and generally increases the overall cost of the optical storage system. For example, larger pin-count packages generally cost more than smaller pin-count packages, and are generally more susceptible to manufacturing defects. Further, larger pin-count packages require a larger surface area on a printed circuit board (PCB).

In order to decrease the required number of pins, an SPI (Serial Peripheral Interface) interface and an LPC (Low Pin Count) interface have been introduced to replace the conventional parallel interface so that a FLASH memory with either the SPI interface or the LPC interface is more useful in an optical storage system. The SPI interface uses 4 pins, i.e., DI, DO, SCK, and CE pins, for synchronous serial communication. The DI and DO pins are, respectively, for transferring data into and out of the FLASH memory. The SCK pin is for transferring a clock signal to synchronize the data transferring operation of the FLASH memory. Data is latched into the FLASH memory serially on the rising edge of the SCLK signal and shifted out of the FLASH memory serially on the falling edge of the SCLK signal. As a result, the required pin number of pins the FLASH memory with the SPI interface can be reduced because data is transferred serially. However, an operating rate of an optical storage system utilizing FLASH memory is limited by serial data transfer, which is not desirable if the optical storage system requires a higher operating rate.

The LPC interface comprises four data pins to transfer data and commands. Since there are four data pins for transferring data instead of two, the performance of a FLASH memory with the LPC interface is faster than with the SPI interface. However, the LPC interface only provides limited interface operations, such as READ and WRITE. Some specific operations which are commonly used by the optical storage system, such as block erase and chip erase, are not supported by the LPC interface. Therefore, a FLASH memory device with the LPC interface is not suitable for use in an optical storage system.

There is thus a general need in the art for an optical storage system including an interface for transferring data in which the required pin number and cost of packaging can be reduced while achieving an acceptable operating rate.

SUMMARY OF THE INVENTION

The present invention is directed to an optical storage system comprising an interface for transferring data in accordance with a selectable parallel bit number, that obviates one or more of the problems due to limitations and disadvantages of the related art.

According to the present invention, there is provided an optical storage system including a plurality of pins for coupling to at least a plurality of peripheral devices. The optical storage system comprises a data read subsystem to read out data stored in an optical storage medium, a data process subsystem to generate address information and data information according to the read out data, and an interface controller to generate output data according to the address information and the data information and to transfer the output data to the peripheral device. The output data includes data information and address information. A number of bits of the output data being transferred in parallel is configurable according to a parallel bit number. The data information and the address information are transferred via the same pins.

Also, according to the present invention, there is provided a method for transferring data between an optical storage system including a plurality of pins and a peripheral device coupled to the optical storage system by an interface. The method comprises reading out data stored in an optical storage medium, generating address information and data information according to the read out data, generating output data according to the address information and the data information; and transferring the output data to the peripheral device. The output data includes data information and address information. A number of bits of the output data being transferred in parallel is configurable according to a parallel bit number. The address information and the data information are transferred via the same pins.

Further, according to the present invention, there is provided an optical storage system for coupling to a FLASH memory. The optical storage system comprises a data read subsystem to read out data stored in an optical storage medium, a data process subsystem to generate output data according to the read out data, and a plurality of pins to transfer the output data to the peripheral device. The output data includes data information and address information. A number of the pins employed to transfer the output data including the address information and the data information is configurable according to a parallel bit number representing a number of bits of the output data to be transferred in parallel. The address information and the data information are transferred via the same pins. The FLASH memory further comprises a memory cell array to store data; and a memory interface controller to control the FLASH memory.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and, together with the description, serve to explain the principles of the invention.

DESCRIPTION OF THE EMBODIMENTS

Reference will now be made in detail to embodiments of the invention, which are illustrated in the accompanying drawings. Wherever possible, the same reference numbers will be used throughout the drawings to refer to the same or like parts.

Figure 1:
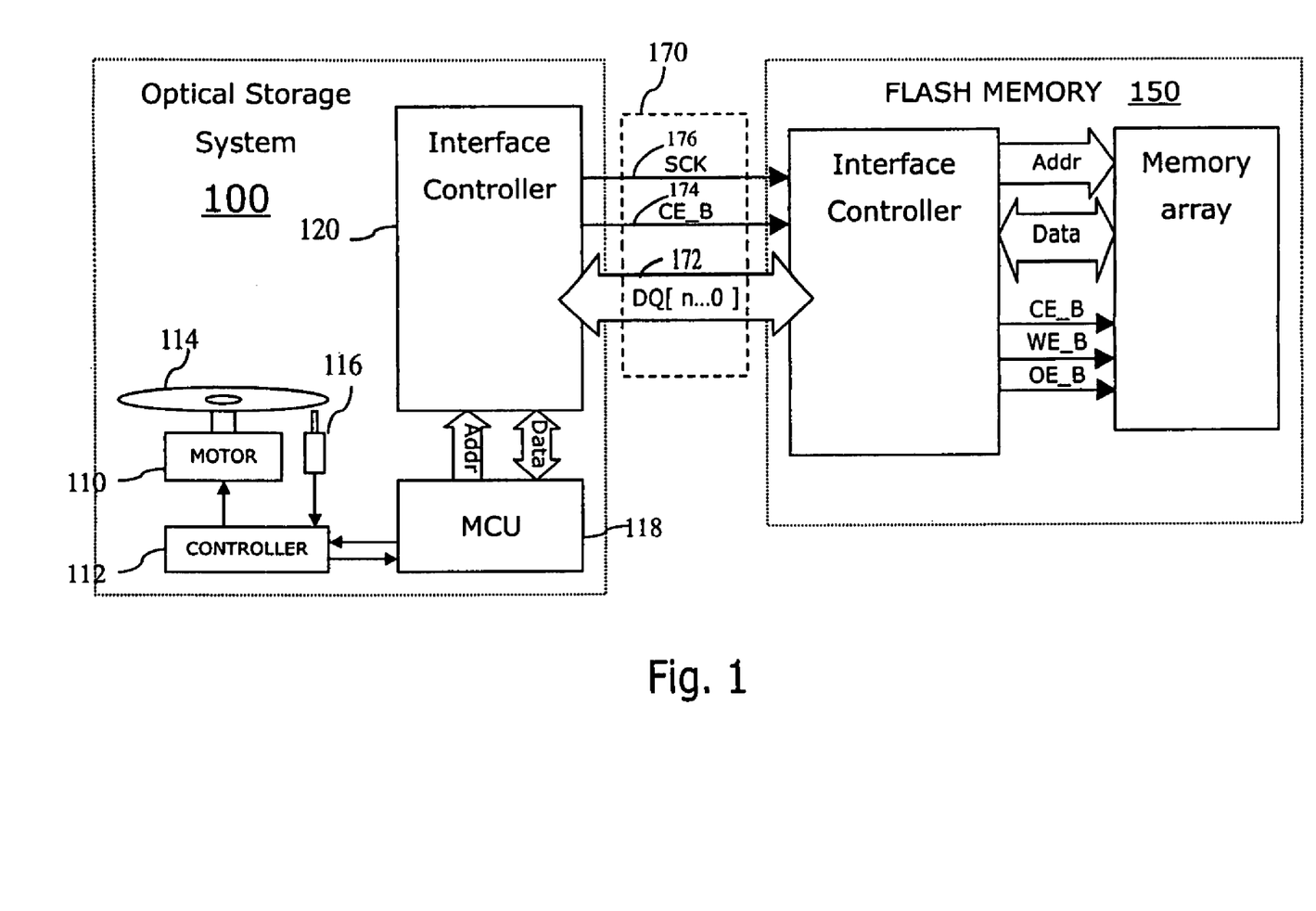
FIG. 1 is a diagram illustrating an optical storage system and a FLASH memory with an interface in between according to an embodiment of the present invention.

FIG. 1 is a diagram illustrating an optical storage system 100 and a FLASH memory 150 with an interface 170 coupled therebetween according to an embodiment of the present invention. Optical storage system 100 and FLASH memory 150 are coupled by interface 170 comprising data buses (DQ[0 . . . n]) 172 for transferring data, a command bus 174 for transferring control commands (CE_B), and a serial clock bus 176 for transferring a serial clock signal (SCK). Optical storage system 100 includes a motor 110, a servo-controller 112 to control motor 110 to rotate a disc 114, and a pick-up laser header 116 to access data stored in disc 114 and to send the accessed data to an MCU (micro controller unit) 118. MCU 118 is adapted to process the accessed data and to generate address information (ADDR) and data information (DATA) according to the accessed data. Optical storage system 100 further includes an interface controller 120 to receive and process the address information (ADDR) and the data information (DATA) sent from MCU 118 and generate output data according to the processed address information and the processed data information. FLASH memory 150 is coupled to optical storage system 100 to store data read out from disc 114. In this embodiment, output data generated by interface controller 120 is to be transferred to FLASH memory 150.

Figure 2:
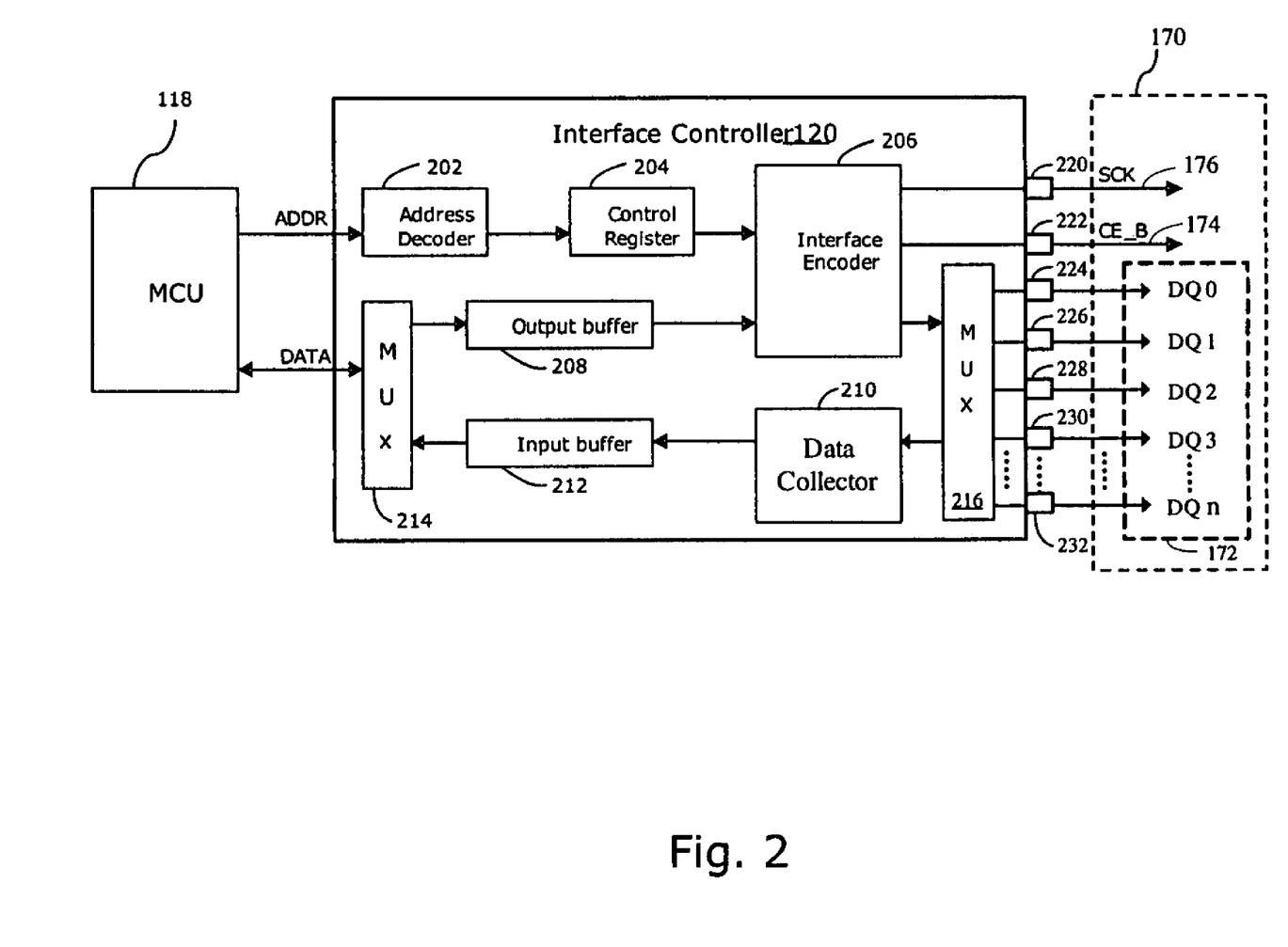
FIG. 2 is a diagram illustrating an interface controller of FIG. 1.

FIG. 2 is a diagram illustrating details of interface controller 120 of FIG. 1. In this embodiment, interface controller 120 is an integrated circuit (IC) packaged within a chip. The chip includes a command pin 222 coupled to command bus 174 of interface 170, a clock signal pin 220 coupled to serial clock bus 176 of interface 170, and input/output data pins 224~232 coupled to data buses (DQ[0 . . . n]) 172, respectively. Interface controller 120 further includes an address decoder 202, a control register 204, an interface encoder 206, and an output buffer 208 for sending data out from optical storage system 100. Interface controller 120 also includes a data collector 210 and an input buffer 212 for inputting data into optical storage system 100. Interface controller 120 further includes two multiplexing (MUX) devices 214 and 216 for controlling data either outputted from or inputted to optical storage system 100. When MCU 118 sends address information (ADDR) and data information (DATA) to interface controller 120, the address information (ADDR) is received by address decoder 202 and the data information (DATA) is received by output buffer 208 under the control of MUX 214. Address decoder 202 decodes the address information (ADDR) and sends the decoded address information (ADDR) to control register 204. Control register 204 determines the peripheral device to which output data is to be sent, based on the decoded address information (ADDR), and a parallel bit number representing the number of bits of output data which are to be transferred in parallel from optical storage system 100 to the selected peripheral device. In this embodiment, the parallel bit number can be determined according to the peripheral device to which output data is to be sent. Then, control register 204 sends an activation signal representing the parallel bit number to interface encoder 206. In the meantime, output buffer 208 receives the data information (DATA) from MCU 118 and sends the data information (DATA) to interface encoder 206. If the decoded address information (ADDR) matches the address of FLASH memory 150, interface encoder 206 sends a memory access request to FLASH memory 150 via command pin 222 and command bus 174. In addition, interface encoder 206 generates output data according to the address information (ADDR), the data information (DATA), and the parallel bit number. After output data is generated, interface encoder 206 sends the output data including the address information (ADDR) and the data information (DATA) to FLASH memory 150 through input/output data pins 224~232 and the corresponding data buses (DQ[0 . . . n]) 172. The number of input/output data pins 224~232 employed to send the output data is determined according to the parallel bit number. The address information and the data information are sent via the same employed input/output data pins 224~232. Interface encoder 206 can also output a serial clock signal (SCK) via clock signal pin 220 to serial clock bus 176 when the output data is being transferred.

In the embodiment described above, the parallel bit number is determined according to the peripheral device to which the output data is to be sent. However, the present invention is not so limited. In another embodiment of the present invention, a parallel bit number can be determined by interface controller 120. Then, interface encoder 206 sends a negotiation signal to a peripheral device to which the output data is to be sent before sending output data. The negotiation signal is to inform the peripheral device what the determined parallel bit number is. After receiving the negotiation signal, the peripheral device sends back an acknowledge signal to inform interface controller 120 that the peripheral device is ready to receive the output data. After receiving the acknowledge signal, interface encoder 206 starts to transfer the output data.

Figure 3:
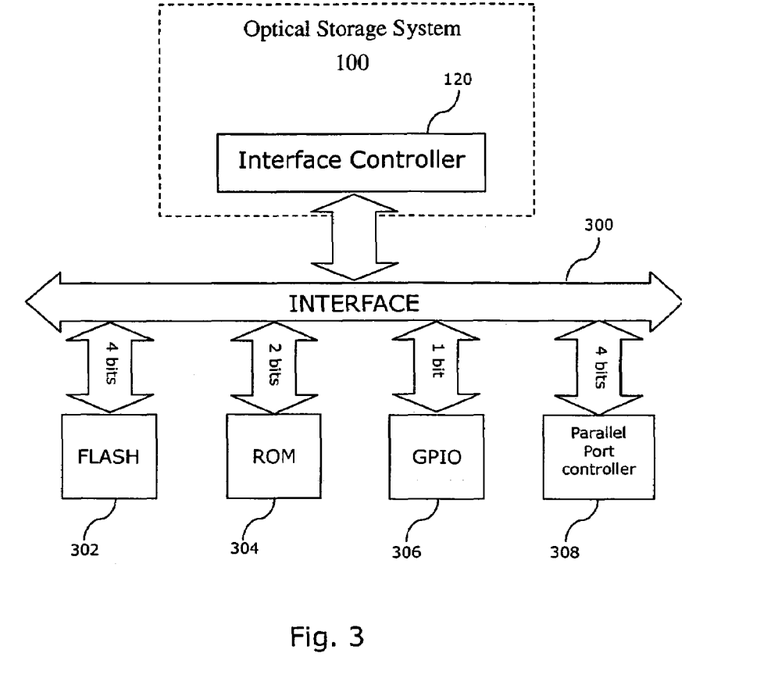
FIG. 3 is a diagram illustrating the optical storage system of FIG. 1 and associated peripheral devices coupled by a common interface for transferring data according to an embodiment of the present invention.

FIG. 3 is a diagram illustrating optical storage system 100 and its peripheral devices coupled by an interface 300 for transferring data with a selectable parallel bit number according to an embodiment of the present invention. Interface 300 of FIG. 3 generally corresponds to interface 170 comprising data bus 172, command bus 174, and serial clock bus 176 shown in FIG. 1. Interface controller 120 of this embodiment outputs data to one of the peripheral devices selected based on address information (ADDR). Output data is transferred serially or as plural bits in parallel according to a parallel bit number.

With reference to FIG. 3, optical storage system 100 can be coupled to plural peripheral devices, such as a FLASH memory device 302, a read-only-memory (ROM) device 304, a general purpose input/output controller (GPIO) 306, and a parallel port controller 308 by the same interface 300. Data transferring requirements and/or operating rates of the peripheral devices coupled to optical storage system 100 may be different. In such a situation, the performance of data transfer can be optimized if the parallel bit number is configurable. For example, if output data is to be sent to a peripheral device with a serial interface, such as GPIO controller 302, interface encoder 206 of interface controller 120 will serially send the output data to GPIO controller 302. Interface controller 120 will also output serial clock signal (SCK) 176 with the output data. As a result, only one of input/output data pins 224~232 is used to serially send output data. The parallel bit number in this case is one.

If output data is to be sent to a peripheral device with an interface which is capable of transferring/receiving multiple bits of data in parallel, interface encoder 206 of interface controller 120 will send the output data to the peripheral device in parallel. More than one of input/output data pins 224~232 are used to send the output data in parallel. The number of input/output data pins 224~232 used to send the output data in parallel is determined based on the capability of the peripheral device which receives the output data. Still with reference to FIG. 3, for example, if output data is to be sent to parallel port controller 308, which comprises an interface decoder capable of receiving four-bit data in parallel, every four bits of the output data are transferred in parallel from interface controller 120 to parallel port controller 308 by interface 300 during the data transfer. The parallel bit number in this case is four.

In this embodiment, the parallel bit number can be set to be 1, 2, 4, or 8. In other words, interface controller 120 can serially send output data when the bit number is 1 or can send 2, 4, or 8 bits of output data in parallel when sending output data to other peripheral devices. FIGS. 4, 5, 6, and 7 are timing diagrams illustrating data transfer formats of output data corresponding to parallel bit numbers 1, 2, 4, and 8, respectively, according to an embodiment of the present invention. Interface controller 120 of optical storage system 100 is compatible with the SPI interface in this embodiment so that the data transfer format of output data is compatible with the SPI interface standard.

Figure 4:
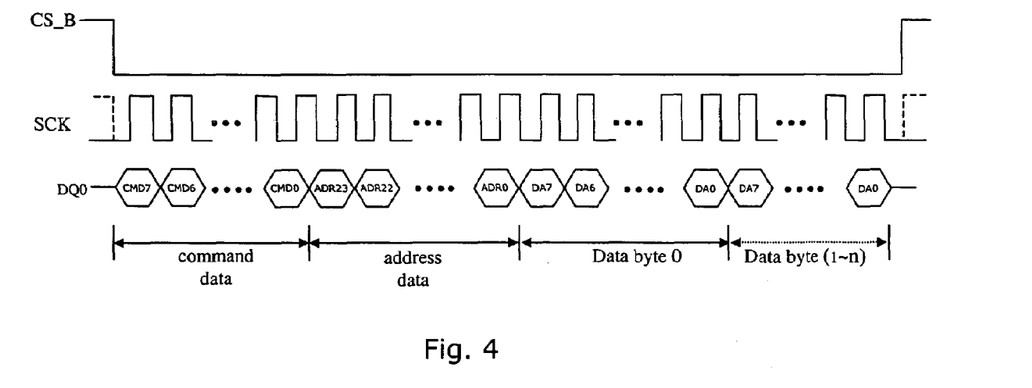
FIGS. 4, 5, 6, and 7 are timing diagrams illustrating formats of data transfer according to different parallel output bit numbers according to an embodiment of the present invention.

With reference to FIG. 4, if the parallel bit number is one (1), the data transfer format is substantially the same as defined by the SPI interface standard, which comprises serial output data including an 8-bit command data (CMD0~CMD7), a 24-bit address data (ADR0~ADR23), and n+1 data blocks each consisting of 8-bit data (DA0~DA7). The serial data is serially outputted via only one input/output data pin, e.g., 224. As a result, only one data bus coupled to input/output data pin 224, i.e., DQ0, is used to serially output the serial data while the other data buses (DQ1~DQ7) are kept idle. In addition to serial output data, the data transfer format further comprises a serial clock signal (SCK) for synchronizing operations of optical storage system 100 and the peripheral device to which the serial output data is to be sent, and an enable command (CE_B) for enabling the data transfer. The serial clock signal (SCK) is sent by clock signal pin 220 to serial clock bus 176 and the enable command (CE_B) is sent by command pin 222 to command bus 174.

Figure 5:
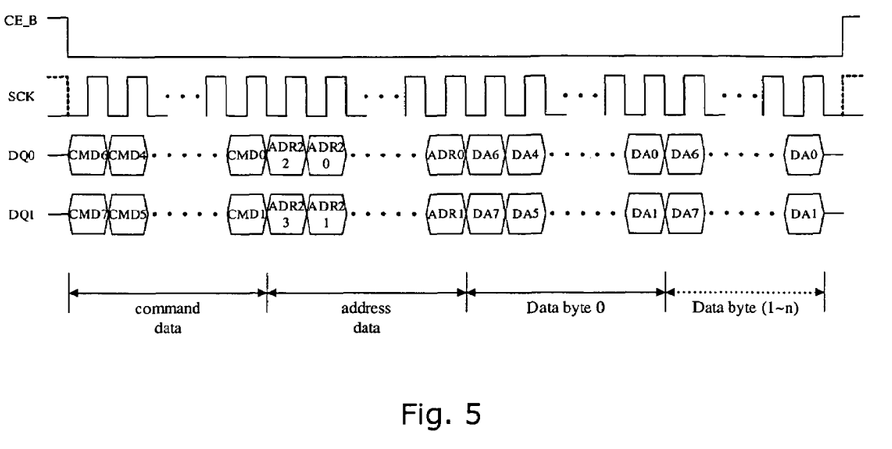

With reference to FIG. 5, if the parallel bit number is two (2), interface encoder 206 will divide output data into two sets of sub-data. For example, referring to FIG. 5, each of the two sets of sub-data comprises a 4-bit sub-command data (e.g., CMD6, CMD4, CMD2, CMD0 on bus DQ0), a 12-bit sub-address data (e.g., ADR22, ADR20, ADR18, . . . , ADR0 on bus DQ0), and n+1 data blocks each consisting of 4-bit sub-data (e.g., DA6, DA4, DA2, DA0 on bus DQ0). Two input/output data pins 224 and 226 are respectively employed to transfer the two sets of sub-data while others of the input/output data pins are kept idle. As a result, every two bits of the output data are transferred in parallel during the data transfer. In addition to the output data, the data transfer format further comprises a serial clock signal (SCK) for synchronizing operations of optical storage system 100 and the peripheral device to which the output data is to be sent, and an enable command (CE_B) for enabling the data transfer, as shown in FIG. 5. The serial clock signal (SCK) is sent by clock signal pin 220 to serial clock bus 176 and the enable command (CE_B) is sent by command pin 222 to command bus 174.

Figure 6:
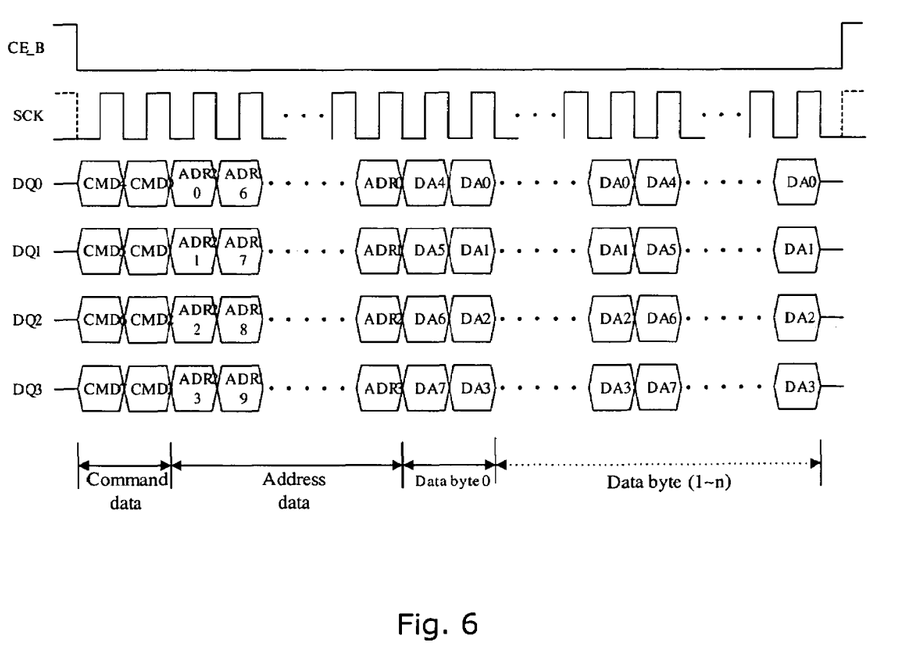

With reference to FIG. 6, if the parallel bit number is four (4), interface encoder 206 will divide the output data into four sets of sub-data. For example, referring to FIG. 6, each set of sub-data comprises a 2-bit sub-command data (e.g., CMD4, CMD0 on bus DQ0), a 6-bit sub-address data (e.g., ADR20, ADR16, . . . ,ADR0 on bus DQ0), and n+1 data blocks each consisting of 2-bit sub-data (e.g., DA4, DA0 on bus DQ0). Four input/output data pins 224, 226, 228, and 230, are respectively employed to output four sets of sub-data while others of the input/output data pins are kept idle. As a result, every four bits of the output data are transferred in parallel during the data transfer. In addition to the output data, the data transfer format further comprises a serial clock signal (SCK) for synchronizing operations of optical storage system 100 and the peripheral device to which the output data is to be sent, and an enable command (CE_B) for enabling the data transfer, as shown in FIG. 6. The serial clock signal (SCK) is sent by clock signal pin 220 to serial clock bus 176 and the enable command (CE_B) is sent by command pin 222 to command bus 174.

Figure 7:
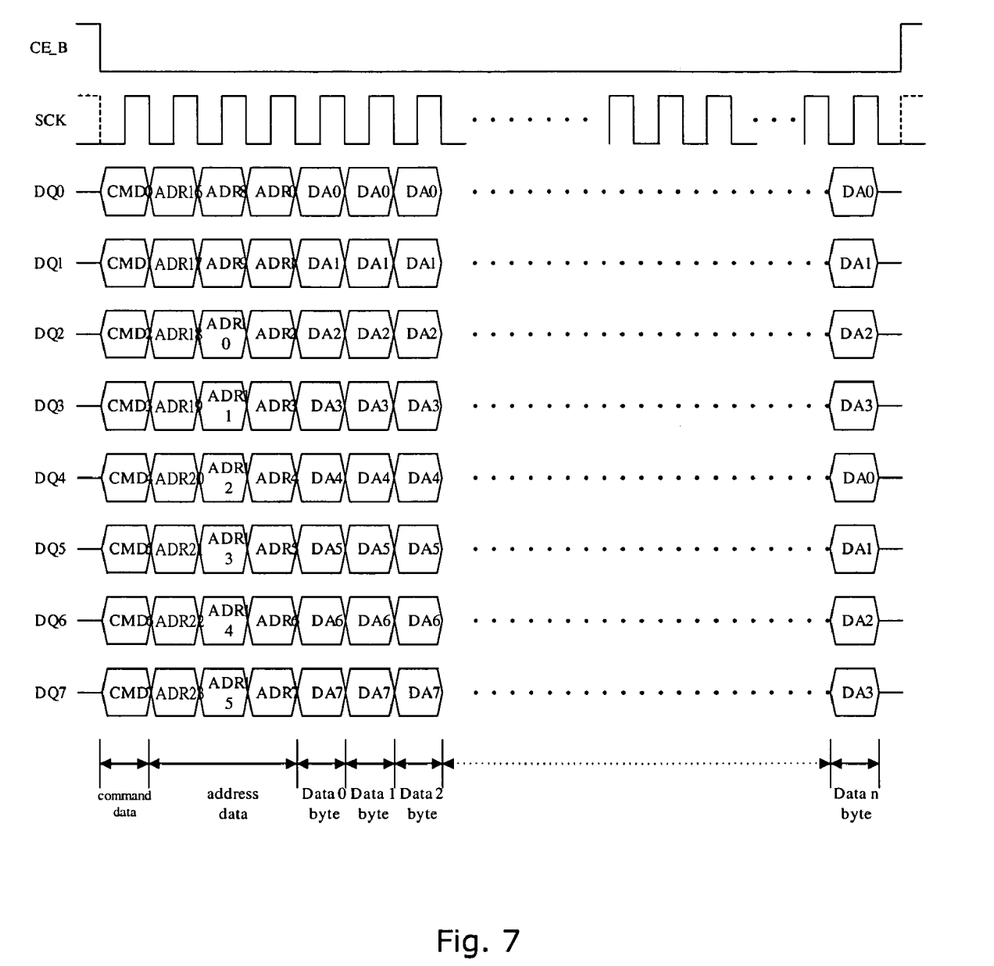

With reference to FIG. 7, if the parallel bit number is eight (8), interface encoder 206 will divide the output data into eight sets of sub-data. For example, referring to FIG. 7, each set of sub-data comprises a 1-bit sub-command data (e.g., CMD0 on bus DQ0), a 3-bit sub-address data (e.g., ADR16, ADR8, ADR0 on bus DQ0), and n+1 data blocks each consisting of a 1-bit sub-data (e.g., DA0 on bus DQ0). Eight input/output data pins 224, 226, 228, 230, etc., are employed to respectively output eight sets of sub-data. As a result, every eight bits of the output data are transferred in parallel during the data transfer. In addition to the output data, the data transfer format further comprises a serial clock signal (SCK) for synchronizing operations of optical storage system 100 and the peripheral device to which the output data is to be sent, and an enable command (CE_B) for enabling the data transfer, as shown in FIG. 7. The serial clock signal (SCK) is sent by clock signal pin 220 to serial clock bus 176 and the enable command (CE_B) is sent by command pin 222 to command bus 174.

Figure 8A:
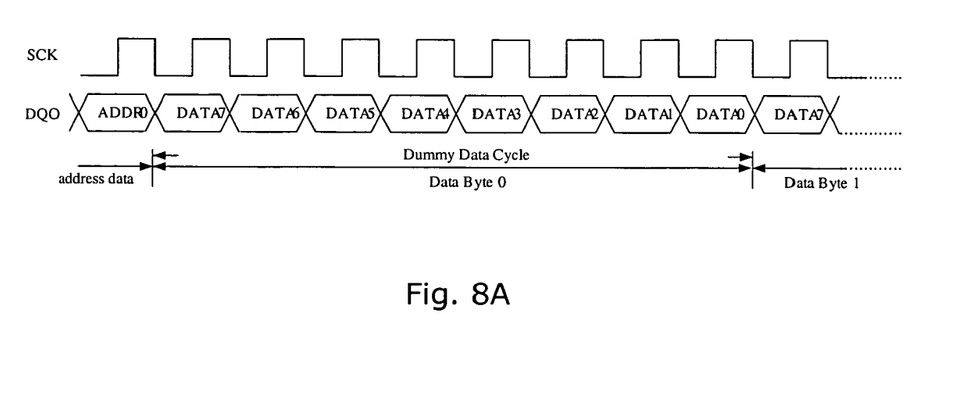
FIG. 8A is a timing diagram illustrating a conventional data transfer format with a dummy data cycle.

FIG. 8A is a timing diagram illustrating a data transfer format, which is compatible with the conventional SPI interface standard. FIG. 8A only illustrates a serial clock signal (SCK) and a portion of a serial output data, which generally corresponds to the serial clock signal (SCK) and the serial output data (DQ0) described above with reference to FIG. 4. The enable command (CE_B) which corresponds to that of FIG. 4 is not shown in FIG. 8A for simplicity. According to the conventional SPI interface standard, the first eight bits of data blocks, i.e., Data Byte 0, are predetermined to be null and the following n data blocks, i.e., Data Bytes (1~n), are predetermined to represent actual data to be sent. In this condition, when an optical storage system serially sends output data to a peripheral device, the time for the peripheral device to receive actual data is delayed by eight clock cycles. This eight-clock-cycle delay is called a dummy data cycle. The purpose of the dummy data cycle is to delay the time to receive the actual data so that the actual data received by the peripheral device are correct even if the operating rate of the optical storage system is high.

Figure 8B:
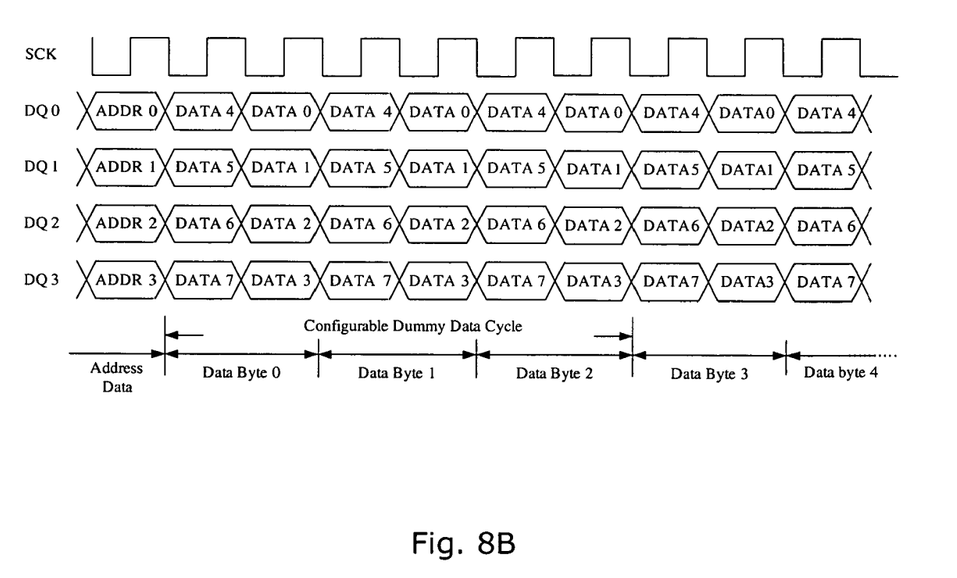
FIG. 8B is a diagram illustrating a data transfer format with a configurable dummy data cycle according to an embodiment of the present invention.

FIG. 8B is a diagram illustrating a data transfer format with a configurable dummy data cycle according to an embodiment of the present invention. In this embodiment, a dummy data cycle can be determined according to a peripheral device to which the output data is to be sent. Interface encoder 206 determines the dummy data cycle while generating output data according to address information (ADDR) and data information (DATA). The output data is transferred so that plural bits of output data are transferred in parallel and the time delay due to the dummy data cycle to receive the actual data, i.e., the following data blocks, can be less than eight clock cycles.

For example, with reference to FIG. 8B, if the parallel bit number is four (4), the data transfer format includes four sets of sub-data DQ0, DQ1, DQ2 and DQ3, and a serial clock signal (SCK), which generally corresponds to the four sets of sub-data and the serial clock signal (SCK) described above with reference to FIG. 6. The enable command (CE_B), which corresponds to that of FIG. 6, is not shown in FIG. 8B for simplicity. In the example shown in FIG. 8B, interface encoder 206 determines a configurable dummy data cycle to be six clock cycles according to a peripheral device to which the four sets of sub-data, i.e., DQ0, DQ1, DQ2 and DQ3, are to be sent. It can be accomplished by predetermining the first 24 bits of data blocks of the output data, i.e., Data Bytes 0~2, to be null according to the determined dummy data cycle and divides the output data into four sets of sub-data according to the parallel bit number. In this condition, only the first six data bits of each set of sub-data, (e.g., DATA4, DATA0 of Data Byte 0, Data Byte 1, and Data Byte 2 of sub-data DQ0) are set to be null so that a time delay of the transfer of the following data blocks representing actual data is only six clock cycles. Since the dummy data cycle of this embodiment is determined according to the peripheral device to which the four sets of sub-data are to be sent, the time delay to receive actual data by the peripheral device can be less than the conventional time delay caused by the conventional dummy data cycle.

After the dummy data cycle is determined, interface controller 120 will send a command to the peripheral device to inform the peripheral device of a time period of the dummy data cycle and the determined parallel bit number for data transfer. In response, the peripheral device will send back the output data to optical storage system 100 so that interface controller 120 can check if the time period of the dummy data cycle is proper by comparing the original output data with the output data sent back and, if necessary, reconfigure the time period of the dummy data cycle based on the result of the comparison.

Figure 9:
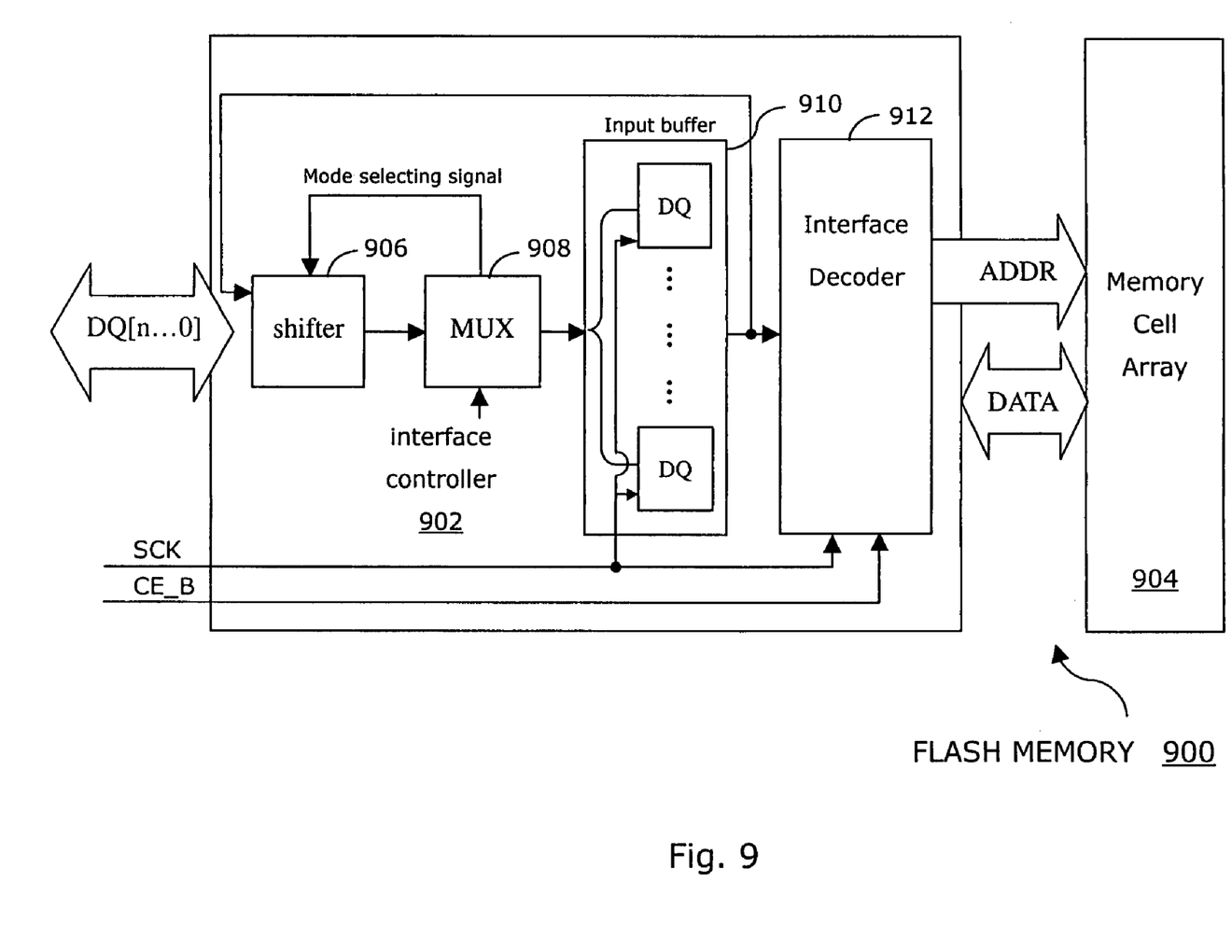
FIG. 9 is a diagram illustrating a FLASH memory comprising an interface controller and a FLASH memory cell array according to an embodiment of the present invention.

FIG. 9 is a diagram illustrating a FLASH memory 900 comprising an interface controller 902 and a memory cell array 904 according to an embodiment of the present invention. In this embodiment, optical storage system 100 can transfer the output data including address information (ADDR) and data information (DATA) with one of the predetermined parallel output bit numbers, i.e., 1, 2, 4, or 8, to FLASH memory 900. FLASH memory 900 has various modes for receiving the output data outputted from optical storage system 100 corresponding to various parallel bit numbers.

Interface controller 902 comprises a shifter 906, a multiplexing circuit 908, an input buffer 910, and an interface decoder 912. For example, if the parallel bit number is four (4), that is, every four bits of the output data are transferred in parallel during data transfer, parts of the data information, which is previously received and stored in input buffer 910, will be shifted by four bits by shifter 906 based on the received parallel bit number. The newly transferred 4-bit data will be merged with the previously received data portion and then the merged data portion is stored in input buffer 910 by multiplexing circuit 908. In the next clock cycle, the next four bits are transferred in parallel, and the data portion stored in input buffer 910 will be retrieved, merged with the newly transferred 4-bit data to become a newly merged data portion, and then stored into input buffer 910. In this manner, when all data bits of the output data are transferred, input buffer 910 will store the entire output data. Then, input buffer 910 outputs the entire output data to interface decoder 912. Interface decoder 912 decodes the entire output data and controls the operation of FLASH 900 based on the decoded output data. For example, according to the decoded command data, interface decoder 912 can write the decoded data bytes into specific memory cells of memory cell array 904 assigned by the decoded address data, or read out specific data and/or commands from specific memory cells of memory cell array 904 assigned by the decoded address data.

Figure 10:
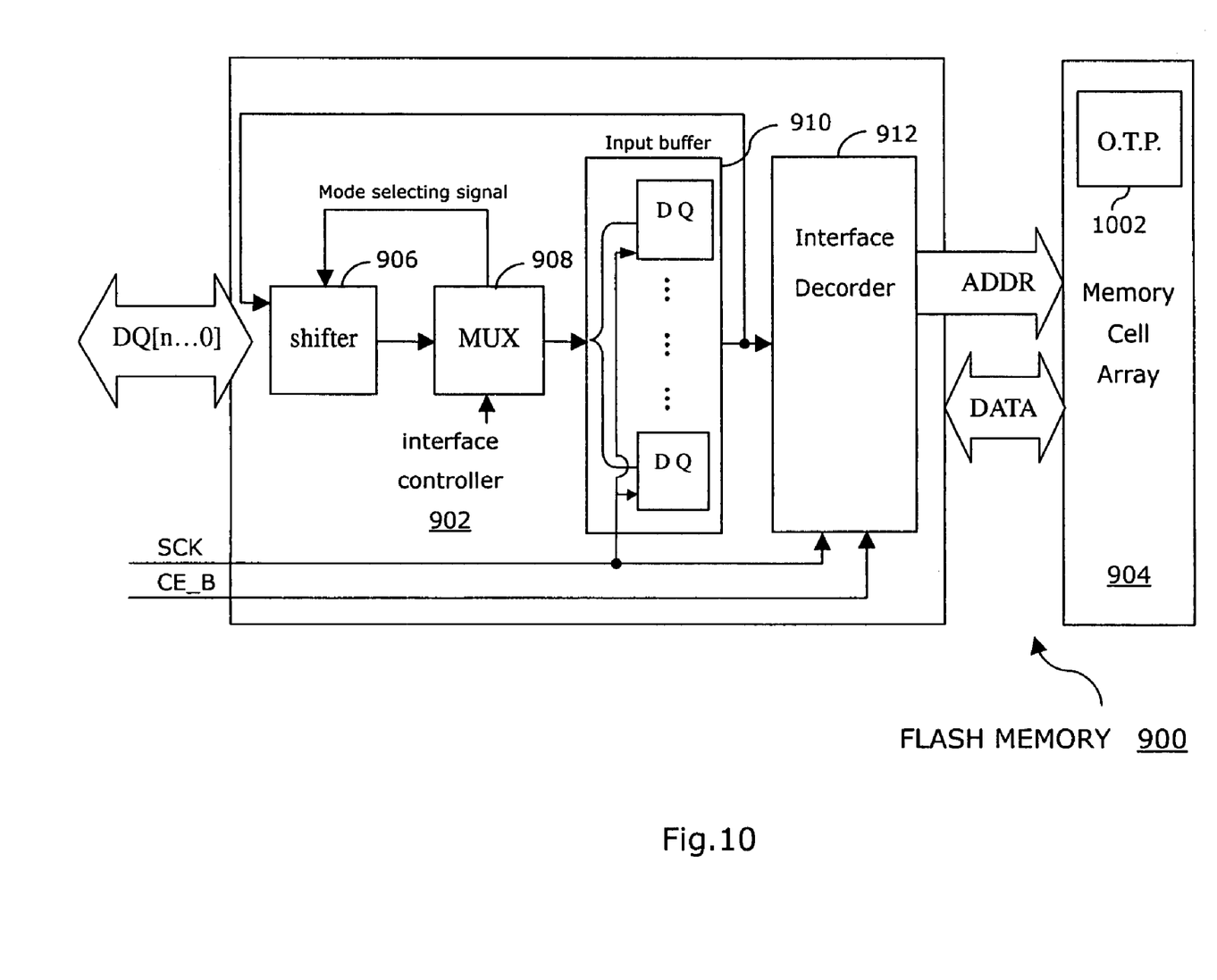
FIG. 10 is a diagram illustrating the FLASH memory of FIG. 9 adapted to store a one-time-program.

FIG. 10 is a diagram illustrating FLASH memory 900 of FIG. 9 configured to store a one time program according to another embodiment of the present invention. Some optical storage systems employ a specific memory device to store a specific program for operating optical storage system 100 called a one time program (OTP). The memory device for storing the OTP can only be written once. When the memory device for storing the OTP is written by the OTP read out from optical storage system 100, it cannot be rewritten, in order to maintain the OTP in the memory device for storing the OTP. In this embodiment, memory cell array 904 of FLASH memory 900 further comprises an OTP portion 1002 for storing the OTP. By setting the operation of interface decoder 912 so that OTP portion 1002 cannot be rewritten after it is written by the data outputted from optical storage system 100, the OTP can be written into OTP portion 1002 of memory cell array 904 by using the method disclosed above, wherein OTP portion 1002 cannot be rewritten. In this manner, optical storage system 100 need not employ a specific write-once memory device for storing the OTP.

Referring back to FIG. 2, interface controller 120 of optical storage system 100 in this embodiment can also be adapted to receive input data with various parallel bit numbers. Interface controller 120 comprises data collector 210 for collecting input data, and input buffer 212 for storing input data. For example, if the parallel bit number of input data is four (4), that is, every four bits of the input data are inputted in parallel into optical storage system 100 via four of data buses DQ[0 . . . n] 172, data collector 210 can merge a portion of the input data which are previously received, with the newly received four bits of the input data in every clock cycle during data receive. When the entire input data are received by data collector 210, the entire input data are moved to input buffer 212. Then, under the control of MUX 214, the entire input data can be moved from input buffer 212 into MCU 118 for further processing. In this embodiment, input data can be sent by one of the peripheral devices coupled to optical storage system 100, such as FLASH memory 150 of FIG. 1. In addition, input data can be inputted into optical storage system 100 so that one or plural bits of input data are being transferred in parallel according to the parallel bit number. The parallel bit number is the number of bits of input data which are being transferred in parallel from one peripheral device to optical storage system 100.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. An optical storage system for coupling to at least a peripheral device, comprising:
    a data read subsystem to read out data stored in an optical storage medium;
    a data process subsystem to process the read out data and to generate data information and address information according to the read out data;
    a plurality of pins: and
    an interface controller to generate output data according to the data information and the address information and to transfer the output data to the peripheral device, wherein a number of bits of the output data being transferred in parallel is configurable according to a parallel bit number, and the data information and the address information are transferred via the same pins, the interface controller comprising:
        an address decoder to decode and output the address information;
        a control register to determine the peripheral device to which the output data is to be transferred according to the decoded address information, and to determine the parallel bit number according to the peripheral device to which the output data is to be transferred;
        an output buffer to store the data information; and
        an interface encoder to generate the output data according to the data information and the address information.

2. The system of claim 1, wherein the parallel bit number is determined by the interface controller.

3. The system of claim 2, wherein the parallel bit number is one of 1, 2, 4, and 8.

4. The system of claim 2, wherein the parallel bit number is determined according to the peripheral device to which output data is to be transferred.

5. The system of claim 1, wherein the interface encoder further divides the output data into a plurality of sets of sub-data according to the parallel bit number, the number of sets of sub-data being the same as the parallel bit number.

6. The system of claim 5, wherein the interface outputs the sets of sub-data in parallel.

7. The system of claim 6, wherein the output data is compatible with a serial peripheral interface (SPI) standard.

8. The system of claim 7, wherein the output data further includes at least a command data, an address data, and a plurality of data blocks, and each of the sets of sub-data further includes at least part of the command data, part of the address data, and part of the data blocks.

9. The system of claim 7, wherein the output data further includes a dummy data cycle and each of the sets of sub-data further includes a sub-dummy data cycle, wherein the sub-dummy data cycle is determined according to the peripheral device to which the output data is to be transferred.

10. The system of claim 9, wherein the sub-dummy data cycle is configurable according to a result of comparing the output data and data sent back by the peripheral device after receiving the output data.

11. The system of claim 1, wherein the pins are for receiving input data from the peripheral device, and wherein a number of bits of the input data received in parallel is determined according to the parallel bit number.

12. The system of claim 11, wherein the data process subsystem further comprises a data collector to receive the input data and an input buffer to store the input data.

13. The system of claim 1, wherein one of the peripheral devices to which the optical storage system can be coupled is a non-volatile memory.

14. The system of claim 1, wherein the optical storage system is a digital video disk (DVD) system.

15. The system of claim 1, wherein the optical storage system is a digital video compact disc (VCD) system.

16. A method for transferring data between an optical storage system including a plurality of pins and a peripheral device coupled to the optical storage system by an interface, comprising:
    reading out data stored in an optical storage medium;
    generating data information and address information according to the read out data;
    generating output data according to the address information and the data information, comprising:
        decoding the address information;
        determining the peripheral device to which the output data is to be transferred according to the decoded address information;
        determining a parallel bit number according to the peripheral device to which the output data is to be transferred;
        storing the data information; and
        generating the output data according to the data information and the address information; and
    transferring the output data to the peripheral device, wherein a number of bits of the output data being transferred is configurable according to the parallel bit number, and the address information and the data information are transferred via the same pins.

17. The method of claim 16, wherein determining includes determining the parallel bit number to be one of 1, 2, 4, and 8.

18. The method of claim 16, wherein the parallel bit number corresponding to the peripheral device is predetermined.

19. The method of claim 16, wherein generating the output data further comprises dividing the output data into a plurality of sets of sub-data according to the parallel bit number, the number of sets of sub-data being the same as the parallel bit number.

20. The method of claim 19, wherein transferring includes transferring the sets of sub-data in parallel.

21. The method of claim 19, wherein the output data is compatible with a serial peripheral interface (SPI) standard, and
    generating includes generating the output data to include at least a command data, an address data, and a plurality of data blocks.

22. The method of claim 21, wherein generating the output data further comprises:
dividing the command data into a plurality of sub-command data;
dividing the address data into a plurality of sub-address data;
dividing the data blocks into a plurality of sub-data blocks; and
generating each sub-data set according to one of the sub-command data, one of the sub-address data, and at least one of the sub-data blocks.

23. The method of claim 21, wherein generating the output data further comprises determining a dummy data cycle according to the parallel bit number, wherein each sub-data set includes at least one of the determined dummy data cycle.

24. The method of claim 23, wherein the dummy data cycle includes at least one data bit, the data bit of the dummy data cycle is set to be null.

25. The method of claim 23, further comprising:
comparing the output data and data sent back by the peripheral device after receiving the output data; and
configuring the dummy data cycle according to a comparison result.

26. The method of claim 16, wherein determining the parallel bit number further comprises:
sending a negotiation signal to the peripheral device to inform the peripheral device of the parallel bit number; and
transferring the output data to the peripheral device after receiving an acknowledge signal sent back from the peripheral device, wherein the acknowledge signal is to inform the optical storage system the peripheral device is ready to receive the output data.

27. The method of claim 26, wherein generating the output data further comprises dividing the output data into a plurality of sets of sub-data according to the parallel bit number, the number of sets of sub-data being the same as the parallel bit number.

28. The method of claim 27, wherein transferring includes transferring the sets of sub-data in parallel.

29. The method of claim 28, wherein the output data is compatible with a serial peripheral interface (SPI) standard and the output data includes at least a command data, an address data, and a plurality of data blocks.

30. The method of claim 29, wherein generating the output data further comprises:
dividing the command data into a plurality of sub-command data;
dividing the address data into a plurality of sub-address data;
dividing the data blocks into a plurality of sub-data blocks; and
generating each sub-data set according to one of the sub-command data, one of the sub-address data, and at least one of the sub-data blocks.

31. The method of claim 16, further comprising:
receiving input data from the peripheral device, wherein a number of bits of the input data received in parallel is determined according to the parallel bit number; and
storing the input data.

32. The method of claim 16, wherein one of the peripheral devices to which the optical storage system can be coupled is a non-volatile memory.

33. The method of claim 16, wherein the optical storage system is a digital video disk(DVD) system.

34. The system of claim 16, wherein the optical storage system is a digital video compact disc (VCD) system.

35. An optical storage system, comprising:
a data read subsystem to read out data stored in an optical storage medium;
a data process subsystem to generate data information and address information according to the read out data;
a plurality of pins for coupling to a non-volatile memory; and
an interface controller to generate output data according to the address information and the data information and to transfer the output data to the non-volatile memory, wherein a number of bits of the output data being transferred in parallel is configurable according to a parallel bit number, and the data information and the address information are outputted via the same pins, the interface controller comprising:
an address decoder to decode and output the address information;
a control register to determine the peripheral device to which the output data is to be transferred according to the decoded address information, and to determine the parallel bit number according to the peripheral device to which the output data is to be transferred;
an output buffer to store the data information; and
an interface encoder to generate the output data according to the data information and the address information;
wherein the non-volatile memory comprises:
a memory cell array to store data; and
a memory interface controller to control the non-volatile memory.

36. The system of claim 35, wherein the memory interface controller further comprises:
an input buffer to store a first portion of the output data;
a shifter to receive a second portion of the output data;
a multiplexing device to merge the first and the second portions of the output data and to store the merged portion of the output data in the input buffer; and
an interface decoder to decode the output data after the entire output data is received and to control the non-volatile memory according to the output data.

37. The system of claim 35, wherein the memory interface controller sends an acknowledge signal to the optical storage system after receiving a negotiation signal sent by the optical storage system for informing the non-volatile memory of the parallel bit number, wherein the acknowledge signal is to inform the optical storage system that the non-volatile memory is ready to receive the output data and the optical storage system starts to transfer the output data after receiving the acknowledge signal.

38. The system of claim 35, wherein the memory cell array of the non-volatile memory further comprises a one-time-program portion to store a one time program (OTP).

39. The system of claim 35, wherein the non-volatile memory is a FLASH memory.

* * * * *